Patented June 8, 1937

2,083,001

UNITED STATES PATENT OFFICE 2,083,001

AMINO ALCOHOLS

Max Bockmühl, Gustav Ehrhart and Leonhard Stein, Frankfort-on-the-Main, Germany, assignors to Winthrop Chemical Company, Inc., New York, N. Y., a corporation of New York No Drawing. Application May 17, 1935, Serial No. 22,112. In Germany June 7, 1934

3 Claims. (Cl. 260—128.5)

The present invention relates to amino alcohols of the following formula:

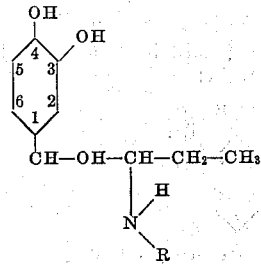

wherein R means a lower alkyl radical or a cyclopentyl radical.

It is known that the phenylamino alcohols, especially the derivatives hydroxylated in the phenyl nucleus, show a vascular action and are applied in therapy inter alia for relieving bronchial spasms. These preparations of which particularly the 3,4-dihydroxyphenylmethylaminoethanol is used, have the drawback that they are highly toxic. Moreover, they show undesired secondary effects on the circulation, especially an increase of blood pressure which is very troublesome in the therapy of asthma.

Now we have found that hitherto unknown compounds may be obtained, which have a similarly strong bronchodilatory efficacy with a considerably smaller toxicity, by transforming 3,4-dihydroxybutyrophenone by a suitable method into the corresponding monoalkylamino alcohols. Thus, by brominating 3,4-dihydroxypropiophenone preferably after a preliminary benzylation and substituting the methylamino group for the bromine, then reducing the methylamino ketone thus produced, there is, for instance, obtained the 3,4-dihydroxyphenyl-methylamino-butanol-1 which, while having the same bronchodilatory efficacy as that of the 3,4-dihydroxyphenyl-methylaminoethanol, has only ½₀₀ of the toxicity of the latter.

By the same method there may be produced the homologues or analogous compounds, particularly the cyclo-alkylamino compounds, which like the methylamino compounds have also a considerable pharmacological activity without showing the undesired secondary effect on the circulation, particularly on the blood pressure which is characteristic of the known alkamines. With the aid of optically active acids the new alkamines may be separated into the optical antipodes. The substances obtainable according to the present process are to be applied in therapy in diseases of the respiratory organs.

The following examples illustrate the invention, but they are not intended to limit it thereto:

(1) 72 grams of 3,4-dibenzyloxybutyrophenone are dissolved in 250 cc. of methylene chloride and mixed, drop by drop, with 32 grams of bromine after the addition of 30 grams of calcium carbonate. When the reaction is complete the solid matter is separated by filtration by suction and washed with methylene chloride and the filtrate and washings are then concentrated in the vacuum. In this manner 88 grams of 3,4-dibenzyloxybromobutyrophenone are obtained which are then dissolved in 100 cc. of alcohol and with the solution are mixed 48 grams of methylbenzylamine. The whole is allowed to stand over night and is then mixed with ether in order to precipitate the methylbenzylaminobromohydrate which has been formed. The crystallized hydrobromide is filtered with suction and subsequently washed with ether. The ethereal solution and washings are then agitated with a sufficient quantity of hydrochloric acid of 10 per cent strength. This precipitates, in the form of a thick oil, the hydrochloride of 3,4-dibenzyloxyphenylmethylbenzylaminobutanone which has been formed during the reaction. The hydrochloride thus obtained is separated, diluted with 5 times its quantity of alcohol and hydrogenated with palladium and hydrogen. When the calculated quantity of hydrogen has been absorbed the whole is filtered by suction from the catalyst and the alcoholic solution is concentrated in the vacuum. The crystalline residue is recrystallized from alcohol or a mixture of alcohol and ethyl acetate. The hydrochloride of 3,4-dihydroxyphenylmethylaminobutanol melts at 166° C. to 168° C.

(2) 42 grams of 3,4-dibenzyloxybromobutyrophenone are dissolved in 50 cc. of alcohol and mixed with 25 grams of ethylbenzylamine. After the whole has been allowed to stand over night, the alcoholic liquid is mixed with ether and the ethylbenzylaminobromohydrate thus precipitated during this operation, is filtered with suction and subsequently washed with ether. The ethereal filtrate and washings are then shaken with about 200 cc. of dilute hydrochloric acid, whereupon the hydrochloride of 3,4-dibenzyloxyethylbenzylaminobutanone is deposited in the form of an oil. The oil obtained is separated, diluted with the sufficient quantity of alcohol and hydrogenated with palladium and hydrogen. When the calculated quantity of hydrogen has been absorbed, the liquid filtered off from the catalyst is concentrated in the vacuum and caused to crystallize by stirring it with acetone. After recrystallization from methanol, on addition of ether, the hydrochloride of 3,4-dihydroxyphenylethylaminobutanol melts at 192° C. to 194° C.

(3) 36 grams of 3,4-dibenzyloxybutyrophenone are mixed in methylene chloride with 16 grams of bromine; when the reaction is complete the whole is worked up as described in Example 1. The 3,4-dibenzyloxybromobutyrophenone thus obtained is dissolved in a small quantity of alcohol and mixed with 17 grams of cyclopentylamine. The mixture is diluted with ether after having been allowed to stand over night and the ethereal solution is agitated with hydrochloric acid of 10 per cent strength. The hydrochloride of 3,4-dibenzyloxycyclopentylaminobutyrophenone deposits in an oily form which is separated, dissolved in a sufficient quantity of alcohol and hydrogenated with palladium and hydrogen. After absorption of two molecular proportions of hydrogen the alcoholic solution is separated from the catalyst by filtration and concentrated in the vacuum. The residue obtained is taken up in a small quantity of water and the 3,4-dihydroxycyclopentylaminobutyrophenone is separated in a crystalline form by means of dilute ammonia. The keto base obtained is then suspended in water and dissolved by the calculated quantity of hydrochloric acid. On hydrogenating this solution with palladium and hydrogen there is obtained the hydrochloride of 3,4-dihydroxyphenylcyclopentylaminobutanol which, when recrystallized from alcohol, melts at 207° C. with decomposition.

We claim:

1. As new products amino alcohols of the following formula:

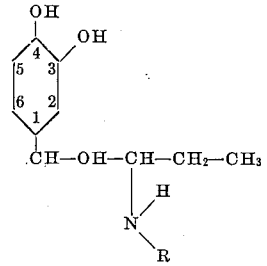

wherein R is a member of the group consisting of a lower alkyl radical and a cyclopentyl radical.

2. As a new product an amino alcohol of the following formula:

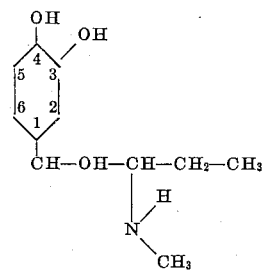

3. As a new product an amino alcohol of the following formula:

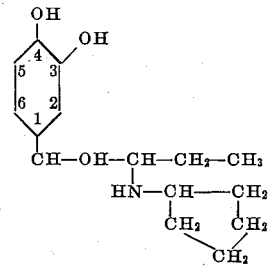

MAX BOCKMÜHL.
GUSTAV EHRHART.
LEONHARD STEIN.